United States Patent
Long, Sr. et al.

(10) Patent No.: US 6,276,104 B1
(45) Date of Patent: Aug. 21, 2001

(54) EXTRUDED POLYSTYRENE FOAM INSULATION LAMINATES FOR POUR-IN-PLACE CONCRETE WALLS

(75) Inventors: Robert T. Long, Sr., Ames, IA (US); Ronald D. Deibel, Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/560,775

(22) Filed: Apr. 28, 2000

Related U.S. Application Data

(60) Provisional application No. 60/132,081, filed on Apr. 30, 1999.

(51) Int. Cl.[7] ...................................................... E04B 1/64
(52) U.S. Cl. .................... 52/309.4; 52/309.7; 52/309.11; 52/309.12; 52/426; 428/318.4
(58) Field of Search ........................... 52/309.4, 309.7, 52/309.04, 309.11, 309.12, 309.16, 426, 404.1, 511–514, 713; 428/317.1, 317.7, 318.4, 319.3, 319.7, 334, 339

(56) References Cited

U.S. PATENT DOCUMENTS

| | | | |
|---|---|---|---|
| 4,489,530 | * 12/1984 | Chang | .................. 52/309.12 |
| 4,795,763 | 1/1989 | Gluck et al. | . |
| 4,804,366 | * 2/1989 | Long | ............................... 52/309.12 X |
| 5,335,472 | * 8/1994 | Phillips | ......................... 52/309.12 X |
| 5,522,194 | * 6/1996 | Graulich | ......................... 52/309.12 X |
| 5,673,525 | * 10/1997 | Keith et al. | ...................... 52/309.11 |
| 5,695,870 | 12/1997 | Kelch et al. | . |

FOREIGN PATENT DOCUMENTS

| | | |
|---|---|---|
| 2018875 | 10/1979 | (GB) . |
| WO 97/18360 | 5/1997 | (WO) . |

OTHER PUBLICATIONS

*Plastic Foams*, Part II; Frisch et al, pp. 544–585, Marcel Dekker, Inc., 1973.

*Plastic Materials*, Brydson, 5th edition, pp. 426–429, Butterworths, 1989.

\* cited by examiner

*Primary Examiner*—Richard Chilcot

(57) ABSTRACT

By using a thermal insulation foam/film laminate wherein each major planar surface of a foam panel has a facer film bonded thereto that meets certain performance criteria rather than a foam panel by itself, composite walls that have a foam panel sandwiched between concrete layers can be made with fewer steps.

17 Claims, 1 Drawing Sheet

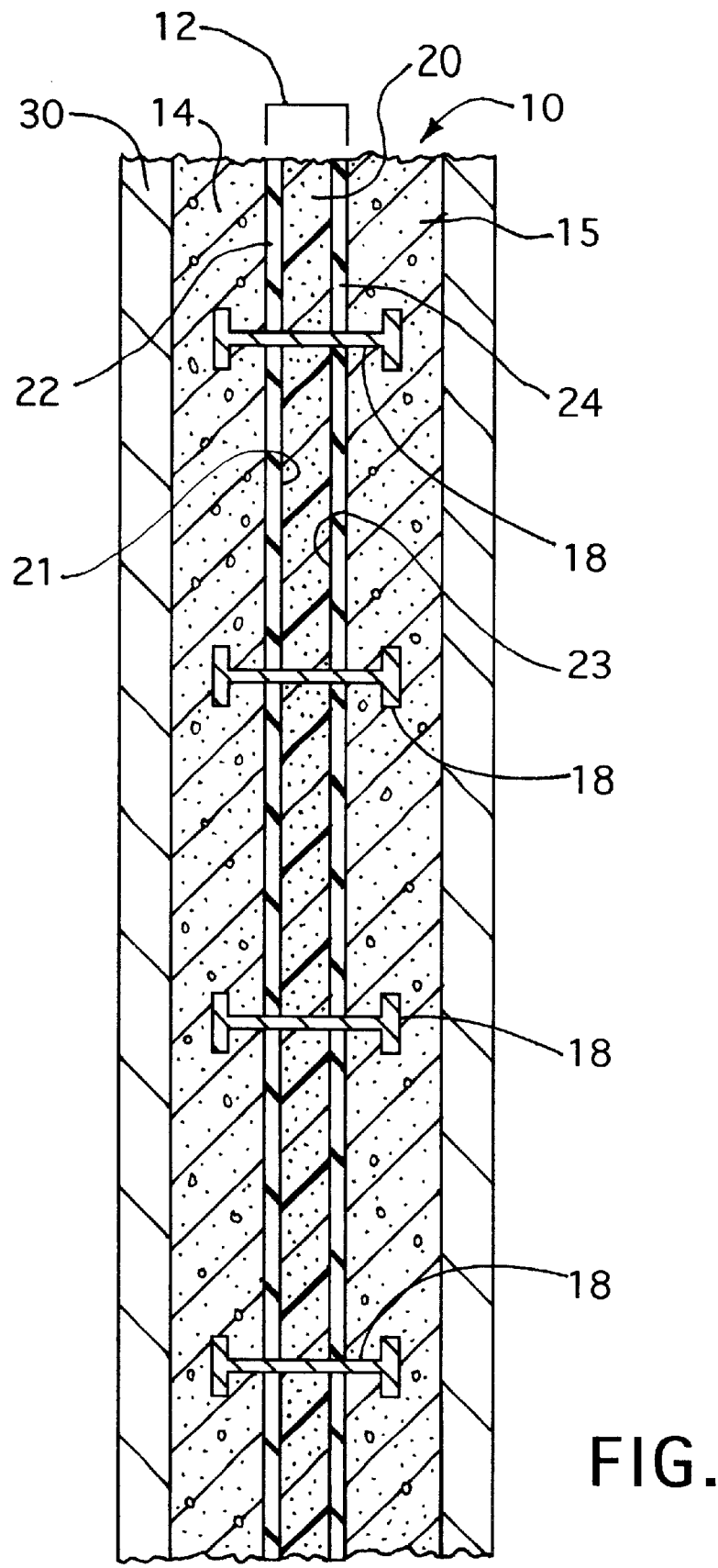
FIG.

EXTRUDED POLYSTYRENE FOAM INSULATION LAMINATES FOR POUR-IN-PLACE CONCRETE WALLS

This application claim benefit to Provisional Application No. 60/132,081 Apr. 30, 1999.

This invention relates generally to insulated building walls and more particularly to insulated concrete building walls.

BACKGROUND OF THE INVENTION

A known means of improving thermal resistance of exterior concrete building walls involves using thermally insulating plastic foam panels as exterior sheathing. While suitable for below ground applications, this means has shortcomings in above ground installation. For example, exposed thermal insulation panel portions can be unsightly. In addition, exposed thermal insulation panel portions may degrade as a result of the weather.

An alternate means, which overcomes shortcomings due to exposed thermal insulation panel portions, provides a composite wall by embedding a thermal insulation panel between two layers of concrete. In building composite walls of this type, one begins with by setting into place spaced-apart rigid forms that define a cavity bounded by wall surfaces. One continues by placing a thermal insulation foam board having opposed major planar surfaces into the cavity to divide the cavity into two subcavities. Pouring concrete into the subcavities yields the composite wall after concrete curing and form removal. Punching connectors through the foam at approximately 12 inch (30.5 centimeter (cm)) intervals before pouring concrete into the subcavities forms a securely connected sandwich of the foam board between the concrete layers after the concrete has cured.

In order to prevent distortion or bursting of the thermal insulation boards, a customary practice involves pouring the concrete in stages, alternating between subcavities to balance forces applied by the weight of the concrete on the opposite sides of the foam boards or panels. For example, a 9 foot wall (2.7 meters (m)) may be formed by pouring concrete into a subcavity on one side of the foam board to a height of about 3 feet (0.9 m), then pouring concrete into a second subcavity on the other side of the foam panel to a height of about 6 feet (1.8 m), then pouring concrete to a height of about 9 feet (2.7 m) in the first subcavity, and then filling the remainder of the second subcavity. Pouring the concrete for composite concrete and foam board walls in stages is undesirable because, at the conclusion of each stage, it is generally necessary to stop pouring concrete, reposition equipment, and begin pouring the next stage. These steps can add significantly to the time required to construct the composite walls. It would be more desirable if the cavities on the opposite sides of the thermal insulation board could be filled with concrete without regard to balancing forces applied by the weight of the concrete on the opposite sides of the insulation panel.

SUMMARY OF THE INVENTION

The invention provides an improved method of forming a composite wall comprising a thermal insulation foam board disposed between concrete layers, and to the resulting composite wall. The thermal insulation foam board has opposed, spaced-apart and generally parallel primary surfaces each of which has a thermal plastic facer film adhered thereto. Each facer film has a thickness of from 0.35 mils (10 micrometers ($\mu$m) to 10.0 mils (250 $\mu$m), an ultimate elongation of less than (<) 200 percent (%) in both machine and transverse directions, a yield tensile strength of at least ($\geq$) 7,000 pounds per square inch (psi) (48,400 kilopascals (kPa)) in both machine and transverse directions, and a 1% secant modulus $\geq$200,000 psi (1,380 megapascals (mPa)) in both machine and transverse directions. The facer films adhere to the panel with a peel strength of $\geq$100 grams per inch (gm/in) (39.4 gm/centimeter (gm/cm)). Thermal insulation foam boards that have films bonded thereto and meet the above criteria are significantly stronger than thermal insulation foam boards that either lack such thermoplastic facer films or have facer films that fail such criteria.

In accordance with the method of the invention, set rigid forms into place to define a thickness for the composite wall and circumscribe a cavity. Set the thermal insulation foam board described above into place between the forms to define two subcavities, each subcavity being defined by a form and a proximate primary surface of the thermal insulation foam board. Fill the subcavities are filled with concrete. Cure the concrete to form a composite wall in accordance with the invention.

The significant improvement in the strength of the thermal insulation foam boards used in accordance with the method of this invention allows the concrete to be poured into the subcavities without regard to balancing forces applied by weight of the concrete against a primary surface of the insulation board. As a result, one subcavity can be completely filled to a height of, for example, 9 feet (2.7 m), while the subcavity on the other side of the insulation board remains unfilled, without causing significant distortion or rupture of the insulation panel The ability to fill the cavities with concrete without regard to balancing forces applied by the weight of the concrete can significantly reduce the time required to fabricate composite walls.

DESCRIPTION OF THE DRAWING

The FIGURE shows a schematic cross-sectional view of a composite wall in accordance with the invention.

DESCRIPTION OF THE PREFERRED EMBODIMENTS

The composite wall 10 of this invention includes a thermal insulation foam board 12 disposed between concrete layers 14 and 15. Several (a plurality) connectors 18 extend through insulation foam board 12 and project into concrete layers 14 and 15. After concrete layers 14 and 15 have cured (solidified), connectors 18 function to securely sandwich board 12 between concrete layers 14, 15. Anchors 18 may take on any known shape or configuration and be made from any known material. Typical materials include thermoplastic materials, fiber reinforced thermoplastic materials, thermoset materials, fiber reinforced thermoset materials, steels, and stainless steels.

Thermal insulation foam board 12 includes a plastic foam material panel 20, with opposing primary surfaces 21 and 23, and first and second thermoplastic facer films 22 and 24 adhered, respectively, to primary surfaces 21 and 23. First and second thermoplastic facer films 22 and 24 each have a thickness of from 0.35 mils (10 $\mu$m) to 10.0 mils (250 $\mu$m), an ultimate elongation <200 % in both machine and transverse directions, a yield tensile strength $\geq$7,000 psi (48,400 kPa) in both machine and transverse directions, and a 1% secant modulus $\geq$200,000 psi (1,380 mPa). More preferably, each facer film has a yield strength $\geq$10,000 psi (69,000 kPa) in both machine and transverse directions. Adhesion between facer films 22 and 24 and corresponding primary surfaces 21 and 23 of panel 20 is sufficient to provide a peel strength ≧100 g/in (39.4 gm/cm).

Composite wall 10 fabrication begins by setting into place, in spaced apart relationship, rigid forms 30, 31 to define a cavity and establish a desired thickness for the composite wall. Fabrication continues by placing thermal insulation foam board 12 into the cavity to define two subcavities. Form 30 and facer film 22 define one subcavity and form 31 and facer film 24 define a second subcavity. Thermal insulation board 12 preferably has a plurality of anchors or connectors 18 that pass through board 12 and extend beyond facer films 22 and 24 and into the respective subcavities. Fabrication concludes by filling the subcavities with concrete and allowing the concrete to cure (solidify). If desired, either subcavity may be completely filled with concrete before adding any concrete to the second subcavity. In addition, both subcavities may be filled simultaneously (or nearly so). Forms 30 and 31 may be, and desirably are, removed from composite wall 10 after concrete curing proceeds to a desired state.

Facer films with a low yield tensile strength tend to exhibit tensile elongation in response to applied stress. A film/foam laminate formed by laminating such a facer film to opposing primary surfaces of a foam board responds to applied stress or impact by bending to a point where the laminate begins to fracture at the facer film/foam board interface. The facer film elongates over the fracture at the interface and allows fracture propagation to continue thereby resulting in ultimate failure of the board. Facer films with higher yield strength tend to have low tensile elongation in response to applied stress, and substantially inhibit, and prevent failure of, the laminate. An increasing facer film secant modulus, or stiffness, enhances overall laminate flexural modulus.

Insulation foam board 12 must have facer films 22 and 24 adhered, respectively, to primary surfaces 21 and 23 and the facer films must have the properties described above together with a minimum facer film/board peel strength of 39.4 gm/cm in order to attain sufficient strength to allow concrete wall fabrication to proceed without requiring sequential, balanced concrete pours into the subcavities.

The plastic facer film may be composed of any thermoplastic polymer as long as it meets the physical property criteria above and can be effectively (with a peel strength ≧39.4 gm/cm) laminated to the foam panel The polymer may be a polyolefin, an alkenyl aromatic polymer, a polyester, a polycarbonate, an acrylic polymer or a polyamide. Useful polyolefins include polyethylene and polypropylene. Useful polyethylenes include high density polyethylene, low density polyethylene, and linear low density polyethylene. The film may be non-oriented, uniaxially oriented, or biaxially oriented. Preferred facer films are biaxially oriented films of polyethylenes, polypropylene, polyesters, polystyrene, or polyamides. The film may be cross-linked or non-crosslinked. The film optionally contains conventional additives such as inorganic fillers, pigments, or colorants, antioxidants, ultraviolet stabilizers, fire retardants, and processing aids.

The facer film may be any of a monolayer film, a coextruded multilayer film or a coated multiple-layer film. The facer film desirably has a thickness range of from 0.35 mil (10 μm) to 10 mls (250 μm). The range is preferably from 0.5 mils (13 μm) to 2 mils (50 μm). The facer film may be laminated to the present foam board by any conventional method. One method includes hot roll laminating a heat-activated adhesive layer on the facer film. Another involves liquid coating or spray coating a hot melt adhesive or liquid-based adhesive onto a facer film or a foam board prior to lamination. An adhesive melt may also be extruded onto the facer film or foam, or coextruded with either the facer film or the foam (preferably the facer film), prior to lamination. Adhesion between the facer film and the foam board must be sufficient to minimize, preferably eliminate, delaminating during impact or bending. Separation or slipping between the facer film and the foam panel at their interface substantially negates any strengthening effect the facer film might otherwise have. The adhesion or peel strength between the facer film and foam board or panel is preferably such that any failure occurs within the foam rather than in the film upon bending board or laminate 12. The peel strength is preferably sufficient to ensure that part or all of any skin on the foam adheres to the film and separates from the remainder of the foam when the film is peeled off the foam. An effective adhesive must therefore adhere to both the facer film and the foam board or substrate. The adhesion is desirably expressed as a peel strength ≧100 grams per inch (gm/in) (39.4 gm/cm) and preferably ≧250 gm/in (98.5 gm/cm), according to the 180 degree peel test (ASTM D-903).

Materials suitable for use as an adhesive or in an adhesive layer include those adhesive materials known in the art as useful with plastic films and foams. They include olefin copolymers such as ethylene/vinyl acetate, ethylene/acrylic acid, ethylene/n-butyl acrylate, ethylene/methylacrylate, ethylene ionomers, and ethylene or propylene graft anhydrides. Other useful adhesives include urethanes, copolyesters and copolyamides, styrene block copolymers such as styrenetbutadiene and styrene/isoprene polymers, and acrylic polymers. The adhesives may be thermoplastic or curable thermoset polymers, and can include tacky, pressure-sensitive adhesives. The material chosen for use as an adhesive or in adhesive layers is preferably recyclable within the foam board manufacturing process. When recycled, the adhesive material desirably does not negatively impact the physical integrity or properties of the foam to a substantial degree.

The foam panel or foam core stock of foam board 12 may comprise any insulation foam known in the art such as extruded polystyrene foam, molded expanded polystyrene foam, extruded polyolefin foam, expanded polyolefin bead or pellet foam, polyisocyanurate foam, and polyurethane foam. The foam panel is desirably an extruded polystyrene foam or a molded, expanded polystyrene foam (known in the industry as "MEPS"). Such foams are readily recyclable, and properly chosen or compatible thermoplastic facer films and adhesive materials are readily recyclable with the foams. Recyclability means the foams can be ground into scrap that can be melt processed with virgin polymer materials, blowing agents, and additives to form new foams. Further, the attractive appearance of the foams can be maintained by using transparent facer films and adhesive materials. The facer films also substantially enhance the strength of thin polystyrene foam boards useful in insulating sheeting applications, particularly boards having a thickness of ¼ in. to 4 in. (6.4 millimeters (mm) to 100 mm). The foam panel, irrespective of the insulation foam from which it is made, has a thickness that is desirably from 1 to 4 in. (25 to 100 mm), preferably from 2 to 4 in (50 to 100 mm), with acceptable results at a thickness of 2 to 3 inches (50 to 75 mm).

The composite walls may be either symmetric or asymmetric. A symmetric wall has a foam core with equal thickness concrete layers on either side of the foam core. A "2+2+2" wall has, for example a 2 in. (50 mm) foam core sandwiched between two 2 in. (50 mm) concrete layers. Similarly, a "3+3+3" composite wall has a 3 in. (75 mm) foam core sandwiched between two 3 in. (75 mm) concrete layers. A "3+3+2" asymmetric wall has a 3 in. (75 mm) foam core sandwiched between a 3 in. (75 mm) concrete layer and a 2 in. (50 mm) concrete layer. These examples simply illustrate potential symmetric and asymmetric wall structures. Any number of variations are possible by changing the thickness of the foam layer, either or both of the concrete layers, or both. Composite walls having two or more foam core layers alternating with concrete layers are also possible if one desires very thick walls.

Polystyrene foams may be derived from conventional alkenyl aromatic polymer materials. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may comprise one or more alkenyl aromatic homopolymers, one or more alkenyl aromatic copolymers, a blend of one or more of each alkenyl aromatic homopolymers and copolymers, or a blend of any of the foregoing with a non-alkenyl aromatic polymer. Regardless of composition, the alkenyl aromatic polymer material preferably comprises greater than (>) 50, more preferably >70 weight percent (wt %) alkenyl aromatic monomer units, based on total alkenyl aromatic polymer material weight. Most preferably, the alkenyl aromatic polymer material comprises 100 wt % alkenyl aromatic monomer units.

Suitable alkenyl aromatic polymers include those derived from alkenyl aromatic monomers such as styrene, alphamethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as two to six carbon atoms (C2–6) alkyl acids and esters, ionomeric derivatives, and C4–6 dienes may be copolymerized with an alkenyl aromatic monomer. Examples of copolymerizable monomers include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene. Preferred foams comprise substantially (i.e., >95 wt %), and most preferably entirely, polystyrene.

Preparing an extruded polymer foam generally involves heating a polymer material to form a heat-plastified or polymer melt material, incorporating a blowing agent therein to form a foamable gel, and extruding the gel through a die into a zone of lower pressure to form the foam. Prior to mixing with the blowing agent, the polymer material is typically heated to a temperature at or above its glass transition temperature, or for these polymers having sufficient crystallinity to have a melt temperature (Tm), near the Tm. "Near" means at, above, or below the Tm and largely depends upon where stable foam exists. The temperature desirably fall within 30 degrees centigrade (° c.) above or below the Tm. Blowing agent incorporation or mixing into the melt polymer material may occur by any means known in the art such as with an extruder, a mixer or a blender. The blowing agent is mixed with the polymer melt at an elevated pressure sufficient to prevent substantial expansion of the polymer melt and to generally disperse the blowing agent homogeneously therein. Optionally, a nucleator may be blended in the polymer melt or dry blended with the polymer material prior to heat plastification. The foamable gel is typically cooled to a lower temperature to optimize physical characteristics of the foam structure. The gel may be cooled in the extruder or other mixing device or in separate coolers. The gel is then extruded or conveyed through a die of desired shape to a reduced or lower pressure to form the foam structure. The zone of lower pressure is at a pressure lower than that in which the foamable gel is maintained prior to extrusion through the die. The lower pressure may be superatmospheric, subatmospheric (evacuated or vacuum), or at an atmospheric level.

MEPS foams may be formed by expansion of pre-expanded beads containing a blowing agent. The expanded beads may be molded at the time of expansion to form articles of various shapes. Processes for making pre-expanded beads and MEPS foam articles are taught in Plastic Foams, Part II, Frisch and Saunders, pp. 544–585, Marcel Dekker, Inc. (1973) and Plastic Materials, Brydson, 5th ed., pp. 426–429, Butterworths (1989), the teachings of which are incorporated herein by reference.

Polyurethane and polyisocyanurate foam structures are usually made by reacting two formulated components, commonly called an A-component and a B-component. Suitable formulated components comprise an isocyanate and a polyol.

Polyurethane foams can be prepared by reacting the polyol and the isocyanate on a 0.7:1 to 1.1:1 equivalent basis. Polyisocyanurate foams can be advantageously prepared by reacting the polyisocyanate with a minor amount of polyol to provide 0.10 to 0.70 hydroxyl equivalents of polyol per equivalent of polyisocyanate. U.S. Pat. No. 4,795,763, the teachings of which are incorporated herein by reference discloses useful polyurethanes and polyisocyanurates and processes for making them.

Blowing agent selection is not critical to the present invention. Blowing agents useful in making the foam board will vary depending upon the composition of the foam, and can include inorganic blowing agents, organic blowing agents and chemical blowing agents. Suitable inorganic blowing agents include carbon dioxide, argon, and water. Organic blowing agents include aliphatic hydrocarbons having 1–9 carbon atoms (C 1–9), C 1–3 aliphatic alcohols, and fully and partially halogenated aliphatic C 1–4 hydrocarbons. Particularly useful agents include n-butane, isobutane, n-pentane, isopentane, ethanol, HFC 22a, 1,1-difluoroethane (HFC-152a), 1,1,1,2-tetrafluoroethane (HFC-134a), ethyl chloride, 1,1-dichloro-1-fluoroethane (HFC-141b), and 1-chloro-1,1-difluoroethane (HFC-142b).

Various additives may be incorporated in the foams such as inorganic fillers, pigments, antioxidants, and scavengers, ultraviolet absorbers, flame retardants, processing aids, extrusion aids.

In addition, a nucleating agent may be added to a polymer melt in order to control foam cell size. Preferred nucleating agents include inorganic substances such as calcium carbonate, talc, clay, titanium dioxide, silica, barium stearate, diatomaceous earth, and mixtures of citric acid and sodium bicarbonate. Suitable nucleating agent amounts range from 0.01 to 5 parts by weight per hundred parts by weight (phr) of a polymer resin. The preferred range is from 0.1 to 3 phr.

Suitable polystyrene foams have a density of from 10 kilograms per cubic meter (kg/m3) to 150 kg/m3, preferably from 10 kg/m3 to 70 kg/m3 and most preferably from 25 kg/m3 to 50 kg/m3, as determined in accordance with ASTM D-1622-88. The polystyrene foams have an average cell size of from 0.1 mm to 5.0 mm and preferably from 0.15 mm to about 1.5 mm as determined in accordance with ASTM D3576-77.

The polyisocyanurate foams and polyurethane foams have a density of from 10 kg/m3 to 150 kg/m3 and most preferably from 10 kg/m3 to 70 kg/m3 according to ASTM D-1622-88.The polyisocyanurate foams and polyurethane foams have an average cell size of from 0.05 mm to 5.0 mm and preferably from 0.1 mm to 1.5 mm according to ASTM D3576-77.

The polystyrene foams may be closed cell or open cell, but are preferably closed cell Preferred polystyrene foams have a closed-cell content according to ASTM D2856-87, >90%.

The present foam board may be used to insulate a surface or an enclosure or building by applying the board to the same. Other useful insulating applications include in roofing, and refrigeration.

The following examples illustrate, but do not limit, the present invention. Unless otherwise indicated, all percentages, parts, or proportions are by weight.

EXAMPLES

Prepare a foam laminate by hot-roll laminating a two-layer film (oriented polypropylene base layer, 2×10−3 mm thick, with an extrusion coated ethylene/vinyl acetate adhesive layer, 1×10−3 mm thick), using a Black Bros. Hot roll laminator, to each side of a 51 mm thick, 1200×2400 mm extruded polystyrene foam sheet. Use a hot roll surface temperature of 190° C., and a line speed of 10 meters/minute.

Evaluate the laminate for breaking strength using a test designed to simulate forces applied against the foam laminate in an actual wall-pouring operation. Suspend the foam between two pieces of dimensional lumber (nominally 50 mm high×100 mm wide and 300 mm long), to provide a span of 220 mm between the pieces of lumber. Apply a single point force to the center of the foam at a rate of 30 pounds (13.6 kilograms (kg)) of force per second. The control foam, with no film on it, falls at 110 kg of force. The laminated foam fails at 173 kg of force. This improvement of over 50% in the breaking strength of the foam translates to a significantly lower failure rate when concrete is poured around the foam when it is suspended between the forms of a pour-in-place concrete wall.

While embodiments of the laminate foam board of the present invention have been shown with regard to specific details, it will be appreciated that, depending upon the manufacturing process and the manufacturer's desires, the present invention may be modified by various changes while still being fairly within the scope of the novel teachings and principles herein set forth.

What is claimed is:

1. An improved method for forming a composite wall comprising a thermal insulation board disposed between concrete layers, the method comprising:

setting into place spaced-apart rigid forms to define a thickness for the composite wall and circumscribe a cavity;

setting into place a thermal insulation foam panel, the panel having opposed, spaced-apart and generally parallel primary surfaces, the foam board being placed within the cavity and between the forms so as to define two subcavities, each subcavity being defined by a form and a proximate primary surface of the thermal insulation foam panel; and filling the subcavities with concrete and thereafter curing the concrete which fills the cavities to form the concrete layers of the composite wall;

wherein the improvement comprises adhering, a thermoplastic facer film to each of the primary surfaces of the foam panel to form a foam board, each thermoplastic facer having a thickness of from 0.35 mils (10 micrometers) to 10 mils (250 micrometers), an ultimate elongation of less than 200% in both machine and transverse directions, a yield strength of at least 7,000 pounds per square inch (48,400 kPa) in both machine and transverse directions, and a 1 percent secant modulus of at least 200,000 pounds per square inch (1,380 megapascals), adhesion between the facer films and the foam panel being sufficient to provide a peel strength of at least 100 grams per inch (39.4 gm/cm).

2. The method of claim 1, wherein peel strength between the facer films and the panel is at least 250 grams per inch (98.5 gm/cm).

3. The method of claim 1, wherein the panel is an extruded polystyrene foam panel.

4. The method of claim 1, wherein the facer films are polypropylene films.

5. The method of claim 1, wherein the facer film thickness is from 0.5 mils (13 micrometers) to 2 mils (50 micrometers).

6. The method of claim 1, wherein the facer film yield strength is at least 10,000 pounds per square inch (69,000 kPa) in both machine and transverse directions.

7. The method of claim 1, wherein the facer films are adhered to the foam panel by means of an adhesive layer.

8. The method of claim 1, wherein the facer film thickness is from 0.5 mils (13 micrometers) to 2 mils (50 micrometers), peel strength between the facer films and the panel is at least 250 grams per inch (98.5 gm/cm), the facer film yield strength is at least 10,000 pounds per square inch (69,000 kPa) in both machine and transverse directions, and the facer films are adhered to the foam panel by means of adhesive layers.

9. A composite wall comprising:

a thermal insulation foam board disposed between concrete layers, the thermal insulation foam board comprising a panel of a plastic foam material, the foam panel having opposite primary surfaces, a first thermoplastic facer film adhered to one of the opposite primary surfaces of the foam panel and a second thermoplastic facer film adhered to the other of the opposite primary surfaces of the foam panel, wherein the first thermoplastic facer film and the second thermoplastic facer film each have a thickness of 0.35 mils (10 micrometers) to 10 mils (25 micrometers), an ultimate elongation of less than 200% in both machine and transverse directions, a yield tensile strength of at least 7,000 pounds per square inch (48,400 kPa) in both machine and transverse directions, and a 1 percent secant modulus of at least 200,000 pounds per square inch (1,380 megapascals), and wherein the adhesion between the facer films and the panel provides a peel strength of at least 100 grams per inch (39.4 gm/cm).

10. The composite wall of claim 9 in which the peel strength between the facer films and the panel is at least 250 grams per inch (98.5 gm/cm).

11. The composite wall of claim 9, wherein the panel is of extruded polystyrene foam.

12. The composite wall of claim 9, wherein the facer films are polypropylene films.

13. The composite wall of claim 9, wherein the facer film is from about 0.5 mils (13 micrometers) to about 3 mils (75 micrometers) thick.

14. The composite wall of claim 9, wherein the panel is of extruded polystyrene foam.

15. The composite wall of claim 9, wherein the facer film has a yield strength of at least 10,000 pounds per square inch (69,000 kPa) in both machine and transverse directions.

16. The composite wall of claim 9, wherein the facer films are adhered to the panel by means of adhesive layers.

17. The composite wall of claim 9, wherein the facer film is from 0.5 mils (13 micrometers) to 3 mils (75 micrometers) thick, the peel strength between the facer films and the panel is at least 250 grams per inch (98.5 gm/cm), the facer films have a yield strength of at least 10,000 per square inch (69,000 kPa) in both machine and transverse directions, and the facer films are adhered to the panel by means of adhesive layers.

* * * * *